United States Patent [19]

Witkowski et al.

[11] Patent Number: 6,034,169

[45] Date of Patent: Mar. 7, 2000

[54] MIXTURES OF AQUEOUS POLYMER DISPERSIONS

[75] Inventors: Reiner Witkowski, Essen; Otto Ganster, Odenthal; Heinrich Königshofen, Bergisch Gladbach; Ralph Ostarek, Duesseldorf, all of Germany

[73] Assignee: Bayer Aktiengesellschaft, Leverkusen, Germany

[21] Appl. No.: 07/939,180

[22] Filed: Sep. 2, 1992

Related U.S. Application Data

[62] Division of application No. 07/641,980, Jan. 16, 1991, abandoned.

[30] Foreign Application Priority Data

Jan. 31, 1990 [DE] Germany .................. 40-02727

[51] Int. Cl.⁷ .................................................. C08L 75/04
[52] U.S. Cl. .................... 524/507; 524/501; 156/327; 156/332
[58] Field of Search ........................ 524/501, 507; 156/327, 332

[56] References Cited

U.S. PATENT DOCUMENTS

| | | | |
|---|---|---|---|
| 3,931,088 | 1/1976 | Sakurada et al. | 260/29.6 RE |
| 4,396,738 | 8/1983 | Powell et al. | 524/228 |
| 4,433,095 | 2/1984 | Hombach et al. | 524/563 |
| 4,636,546 | 1/1987 | Chao | 524/507 |
| 4,636,547 | 1/1987 | Chao | 524/507 |
| 4,663,377 | 5/1987 | Hombach et al. | 524/500 |
| 4,734,310 | 3/1988 | Briat et al. | 428/151 |
| 4,762,880 | 8/1988 | Leung | 524/853 |

FOREIGN PATENT DOCUMENTS

| | | |
|---|---|---|
| 035251 | 9/1981 | European Pat. Off. . |
| 276482 | 8/1988 | European Pat. Off. . |
| 2643642 | 7/1979 | Germany . |
| 11279 | 1/1968 | Japan . |
| 69137 | 6/1975 | Japan . |
| 102334 | 8/1979 | Japan . |

OTHER PUBLICATIONS

JP 49 017 438, Asahi Chemical Ind. Abstract, Apr. 30, 1994.

*Primary Examiner*—David W. Wu
*Attorney, Agent, or Firm*—Joseph C. Gil; Godfried R. Akorli; Noland J. Cheung

[57] ABSTRACT

The present invention is directed to a novel adhesive which is a mixture of

A) at least one aqueous dispersion of a polymer which has a softening point below 70° C., said dispersion containing 5 to 70% by weight solids and having a film-forming temperature below 70° C., and B) at least one aqueous dispersion of a polymer based on olefinically unsaturated monomers having a softening point is above 70° C., said dispersion containing 5 to 70% by weight solids, wherein the weight ratio of dispersion A) to dispersion B) is from 97:3 to 60:40, based on the solids content of said dispersions.

5 Claims, No Drawings

MIXTURES OF AQUEOUS POLYMER DISPERSIONS

This application is a division of application Ser. No. 07/641,980 filed Jan. 16, 1991 now abandoned.

BACKGROUND OF THE INVENTION

The present invention relates to mixtures of aqueous polymer dispersions and to a process for bonding substrates using these mixtures.

In the automotive industry and particularly in car construction, a continuously increasing number of parts for the interior trim of motor vehicles, such as side parts, instrument panels, covers and shelves, are being made of PVC-film-laminated fiberboard moldings and, more recently, of thermoplastics. In the lamination process (vacuum forming), resilience forces, and, in some cases, extremely strong resilience forces, occur due to the locally high elongation of the laminating film. These forces are transmitted from the adhesive to the substrate. Under extreme climatic conditions, a laminated interior part must withstand high temperatures for prolonged periods without delamination. Another problem in the production of laminated interior parts is the migration of plasticizer from the PVC film material which can clearly reduce the strength of the bond over a period of time. To date, the high property profile for bonds of this type has only been achieved by solvent-containing two-component polyurethane systems.

For reasons of pollution control, industrial hygiene and safety in processing, polymer dispersions, particularly polyurethane dispersions, are being increasingly used for this purpose.

Adhesive compounds based on aqueous polymer dispersions are known. Homopolymers and copolymers of acrylate and vinyl acetate monomers are widely used for adhesive compounds. These latices are modified with isocyanate reactive monomers to obtain high-quality, crosslinkable adhesives or coatings.

German Auslegeschrift 2,643,642 describes the modification of an acrylate dispersion containing 0.1 to 100 parts by weight (based on dispersion solids) of an isocyanate. The dispersion serves as a contact adhesive compound. Another example of an isocyanate-modified polymer dispersion can be found in Japanese Kokai No. 75/69137 which describes the production of a waterproof adhesive compound of an aqueous polymer dispersion (such as a butadiene/methylmethacrylate latex), a polyvinyl alcohol and an isocyanate component in an apolar solvent.

Japanese patent application 79/102334 describes an adhesive compound containing a water-soluble polymer or aqueous polymer dispersion and a hydrophilic compound containing at least two isocyanate groups per molecule. Cellulose derivatives or polyvinyl pyrrolidone for example are used as the water-soluble polymers while ethylene/vinyl acetate and vinyl acetate/acrylic acid copolymers are used as the polymer dispersions. The hydrophilic component consists of a reaction product of a diisocyanate and an isocyanate-reactive polyether. The adhesive compound shows high resistance to water.

Japanese patent application 69/11279 describes an adhesive compound of high bond strength and high resistance to ageing and to chemicals. The compound in question consists of a mixture of a polymer dispersion containing carboxylate groups with an isocyanate-reactive copolymer and is intended in particular for the coating of textiles.

U.S. Pat. No. 4,396,738 describes an aqueous adhesive compound and coating compound of an aqueous dispersion of a polymer or copolymer and an aqueous dispersion of a polyisocyanate at least partly reacted off with a monofunctional alcohol.

U.S. Pat. No. 4,433,095 describes an adhesive compound of an aqueous polymer dispersion and a water-dispersible aromatic polyisocyanate having an isocyanate functionality of more than 2.2. Mixtures of dispersions are not described in detail.

U.S. Pat. No. 3,931,088 describes the production of adhesive compounds containing an aqueous solution of a polyvinyl alcohol, an aqueous emulsion of a vinyl acetate polymer and/or an aqueous latex of a butadiene polymer and also a solution of an isocyanate compound or an isocyanate polymer.

U.S. Pat. No. 4,636,546 describes a process for the production of coatings and adhesive compounds in which aqueous dispersions of polymers containing isocyanate-reactive hydrogen are first reacted with a water-emulsifiable polyisocyanate and are then mixed with an aqueous polyurethane dispersion. The necessary preliminary reaction means that the process involves an additional step.

U.S. Pat. No. 4,762,880 describes an adhesive compound for a heat laminating process which consists of a dispersion of an aromatically substituted polyurethane and an emulsifiable polyisocyanate. The laminating process takes place at high temperatures of the order of 150° C. which can result in damage to the substrate and to the laminate.

European patent 276,482 describes mixtures of aqueous polymer dispersions and their use as coating compounds and coatings. The claimed mixtures are distinguished by improved fastness to wet rubbing, a more pleasant feel and improved ironability on such substrates as fabrics or leather. However, the films formed only soften at high temperatures which are too high for heat laminating processes with thermoplastics, such as ABS.

The problem addressed by the present invention was to provide adhesives having a reduced activation temperature and improved adhesion, particularly for ABS (i.e., acrylonitrile/butadiene/styrene).

DESCRIPTION OF THE INVENTION

The present invention is directed to a mixture of aqueous polymer dispersions comprising A) at least one dispersion of a polymer which has a softening point below 70° C. and more particularly below 60° C., said dispersion containing from 5 to 70% by weight solids and having a film-forming temperature below 70° C. and preferably between 20 and 50° C., B) at least one dispersion of a polymer of olefinically unsaturated monomers, said polymer having a softening point above 70° C., said dispersion containing 5 to 70% by weight solids, the weight ratio of dispersion A) to dispersion B) being from 97:3 to 60:40, based on the total solids contents of dispersions A) and B), C) optionally at least one polyisocyanate compound containing at least two isocyanate groups which is preferably added to the dispersions in a quantity of 0.1 to 20 parts by weight, based on 100 g solids of dispersions A) and B), and D) optionally standard additives.

To determine the softening temperature of polymers, the dispersions adjusted to a solids content of 30% are placed in Teflon pans and dried for 3 days at room temperature, for 20 hours at 65° C. and for 20 minutes at 130° C. The thermomechanical analysis (TMA) is carried out in a helium atmosphere using a Perkin Elmer TMA 7 with the following setting:

a) diameter of the penetration probe 0.89 mm, b) probe load 50 g, c) heating rate 5° C./minute, and d) temperature range −100 to +120° C.

The softening temperature is the temperature at which the weighted probe clearly penetrates into the melting polymer film. This process is reflected in a distinct break point in a graph in which the percentage depth of penetration of the probe is plotted against the film temperature.

In one preferred embodiment, dispersion B) is a dispersion having a film-forming temperature above 70° C.

To determine the film forming temperature, the aqueous dispersion is poured into a Teflon pan and the water is evaporated. The minimum film forming temperature is the temperature which must at least be present after evaporation to obtain a compact polymer film.

In one preferred embodiment, the components (in solids) are present in the following percentages by weight, based on the aqueous mixture as a whole:

A) from 36 to 22% by weight and more especially from 32 to 22% by weight,

B) from 4 to 16% by weight and more especially from 8 to 16% by weight,

C) from 0 to 10% by weight and more especially from 0 to 3% by weight,

D) from 0 to 10% by weight and more especially from 0 to 25% by weight.

The mixtures of aqueous polymer dispersions according to the present invention are distinguished from adhesive compounds corresponding to the prior art by a number of advantages.

Their adhesion to non-pretreated substrates which are extremely difficult to bond using aqueous adhesive dispersions, such as ABS for example, is distinctly improved. The heat resistances of the bonds of PVC-laminated substrates is also distinctly increased.

It has surprisingly been found that the activatability of the adhesive films produced from the adhesive compounds according to the invention, despite high percentage contents of the emulsion polymer B), remains substantially constant and substantially corresponds to the activatability of pure polymer dispersions preferably polyurethane dispersions, having a film forming temperature below 70° C.

In contrast to the process described in U.S. Pat. No. 4,636,546, the present invention is distinguished by the fact that the production of the adhesive compound is not necessarily dependent on the presence of active hydrogen groups in the emulsion polymer, thus eliminating an additional process step, i.e. the reaction of an emulsifiable polyisocyanate with the emulsion polymer containing isocyanate-reactive groups. The adhesive preparation is considerably simplified in this way.

Anionic, cationic or nonionically modified polymers may be used as the polymer of dispersion A). Polyurethane dispersions are preferably used as the dispersions having a film forming temperature below 70° C. The polyurethane dispersions are known and are preferably produced in accordance with British patent 1,076,668, German patent 1,184, 946, German Auslegeschrift 1,495,745, German Offenlegungsschriften 1,495,847, 2,035,732, 2,344,135, and 2,446, 440, U.S. Pat. Nos. 3,479,310, 3,756,992, and 3,905,929, and European patent 304,718, "Die angewandte makromolekulare Chemie" 26, 1972, pages 85 to 106, or "Angewandte Chemie", 82, 1970, pages 53 to 63.

Aqueous dispersions having a film forming temperature below 70° C. may also be dispersions based on natural or synthetic rubber, polybutadiene, polychloroprene, polyethylene, chlorosulfonated polyethylene, optionally partly hydrolyzed EVA copolymers and polyacrylonitrile.

The isocyanate components, relatively high molecular weight polyhydroxy compounds (polyhydroxypolyesters, ethers and carbonates) having a molecular weight of 400 to 10,000 and chain-extending agents containing at least two isocyanate reactive hydrogen atoms and preferably having a molecular weight of 18 to 399 known per se in polyurethane chemistry are used for the production of the polyurethanes. Ionic compounds containing at least one hydrophilic group, such as for example a tertiary or quaternary ammonium group, a carboxylate or sulfonate group or a group convertible into such groups in addition to at least one isocyanate-reactive group are also used. In addition, nonionic hydrophilic compounds containing ethylene oxide units arranged terminally and/or laterally in a polyether chain in addition to at least one isocyanate-reactive group may also be incorporated. The content of ionic groups is preferably between 2 and 200 meq/100 g polyurethane and preferably between 2 and 100 meq/100 g polyurethane while the content of ethylene oxide units, based on the polyurethane, is between 0 and 25% by weight and preferably between 0 and 15% by weight.

In addition, auxiliaries and additives (solvents, neutralizing agents, emulsifiers, catalysts) may be used for the production of the dispersions described above.

The polyurethane dispersions may be produced either by the so-called "acetone process" as described in German Auslegeschrift 1,495,745 and U.S. Pat. No. 3,479,310; by the "ketimine/ketazine process" as described in German Auslegeschrift 2,725,589, U.S. Pat. Nos. 4,269,748, 4,192, 937 or 4,292,226; by the "melt dispersion process" as described in German Auslegeschriften 1,770,068 and 2,637, 690 or U.S. Pat. No. 3,756,992; or even by the method according to U.S. Pat. No. 4,387,181.

The dispersions A) to be used in accordance with the invention preferably have a solids content of 5 to 70% by weight and, more preferably, 35 to 50% by weight. Their average particle diameter is preferably between 20 and 800 nm.

If polyurethanes are used as dispersion A), they preferably contain isocyanate reactive terminal groups, more particularly mercapto groups and, above all, hydroxyl and amino groups.

The dispersions B) are prepared in accordance with the prior art by known methods of emulsion polymerization. They are preferably based on polymers/copolymers of $\alpha,\beta$-unsaturated monomers and/or dienes as described in U.S. Pat. No. 3,939,013 and German Auslegeschriften 2,014,385, 1,935,345, 1,935,348 and 1,935,349. Basically, the dispersions B) may be any polymer dispersions having the properties mentioned, for example dispersions based on styrene-butadiene copolymers, styrene-acrylonitrile copolymers, poly-$\alpha$-methyl styrene, polystyrene, polybutadiene-acrylonitrile copolymers and polyacrylates. Polymers based on butadiene and compounds containing vinyl groups (preferably aromatic compounds), are preferably used. Polymers of acrylonitrile and/or $\alpha$-methyl styrene, of the type described for example in U.S. Pat. No. 4,009,226 and German Auslegeschriften 3,305,544 and 3,006,804, are particularly preferred. In the case of styrene and/or $\alpha$-methyl styrene copolymers, the styrene or $\alpha$-methyl styrene content should be at least 60% by weight and preferably 60 to 75% by weight.

The solids content of the dispersions B) to be used in accordance with the invention is between 5 and 70% by weight and preferably between 10 and 60% by weight.

Dispersion A) and dispersion B) are mixed in a ratio of 97:3 to 60:40 and, more particularly, in a ratio of 80:20 to 60:40, based on parts by weight solids. The dispersions may be mixed by mixing the prepared dispersions together in the desired ratios using stirrers and mixers of simple design and construction.

Preferred polyisocyanate compounds C) are polyisocyanate preparations of aliphatic and/or aromatic polyisocyanates which can be emulsified in water through incorporated ionic and/or nonionic groups, cf. for example German Auslegeschrift 3,521,618 (U.S. Pat. No. 4,663,377). Particular preferred are the dispersible polyisocyanate preparations of an aliphatic polyisocyanate and a quantity of an emulsifier which guarantees the dispersibility of the polyisocyanate, the emulsifier containing in particular the reaction product of an aliphatic polyisocyanate with a monohydric or polyhydric, nonionic polyalkylene ether alcohol containing at least one polyether chain with at least 10 ethylene oxide units.

The polyisocyanate C) is preferably added to the mixture as follows: before processing, a weighed-out quantity of polyisocyanate C) is introduced into the mixture of dispersions A) and B) and the adhesive compound is thoroughly stirred for about 1 minute.

Where the dispersion mixtures according to the invention are used as adhesives, auxiliaries and additives D) typically used in the adhesives field, such as thickeners, pigments and stabilizers, may be incorporated.

Adhesives based on mixtures of A) and B) according to the invention are particularly suitable as adhesives for heat laminating processes and, more especially, as adhesives for the lamination of ABS with films of plasticized PVC or PVC foam by thermoforming. The adhesive compounds according to the invention may be applied by any of the known techniques for aqueous dispersions, including for example spray coating, spread coating, knife coating or casting.

The invention is illustrated by the following Examples in which all quantities are in parts by weight or by weight.
Preparation of the adhesive dispersions:

The adhesive were prepared by stirring emulsifiable isocyanate C) into the mixture of dispersions A) and B).
Determination of the heat resistance of PVC-PVC bonds (softening point; SP)

2.5 cm wide strips of a flexible PVC are coated with the adhesive dispersion in a layer thickness of 0.1 mm. After air drying for 5 hours, the adhesive surfaces are heated by radiation to a temperature of 50° C. in 4 seconds. The adhesive-coated strips are then placed together so that an overlapping area of 2.5×2.5 cm is obtained. The test specimens are then subjected to a pressure of 0.4 mPa for 10 seconds and subsequently stored for 3 days at room temperature.

Heat resistance is determined in a tensile shear test. In this test, the test specimen is subjected on one side to a load of 11 kg. After heating for 20 minutes at 40° C., the temperature at which the bond fails is determined by increasing the temperature of the bond at a rate of 0.25° C. per minute.

The dispersions are used for bonding PVC to PVC and PVC film to ABS.
PVC:

Transparent, 4 mm thick, 30% dioctyl phthalate as plasticizer. Before application of the dispersion, the surfaces to be bonded were thoroughly roughened (grade 40 sandpaper) and freed from the abrasion dust. A 0.1 mm thick wet adhesive layer was applied to the substrates and air dried for 30 minutes at room temperature.
ABS:

Commercially available ABS for interior parts of automobiles; smooth, test specimen 150×25 mm. For bonding, the test specimens were coated with a 0.1 m thick layer of adhesive without any pretreatment and then air dried for 30 minutes at room temperature.
PVC film:

A commercially available, 1.6 mm thick PVC laminating film was used.
Determination of the activation temperature of the adhesive films (MAT):

0.1 mm thick layers of the adhesive compounds were applied to two roughened PVC strips (200×30 mm) and air dried for 1 hour at room temperature and then for 24 hours under standard climatic conditions (one-component application). Bonding is carried out by heat activation in a Funck activator (type A 1000). To this end, a 10 mm wide strip is shock-activated and immediately placed crosswise over a second strip which has not been activated. The resulting bonded area of 1 $cm^2$ is subjected to a pressure of 0.5 bar for 10 seconds in a cushion press. Film coalescence is evaluated during separation of the bond. The adhesive film is sufficiently activated if substantially complete (100%) film coalescence occurs during bonding. The activation time is varied between 1 and 10 seconds, the temperature of the adhesive film increasing with increasing activation time.
Peeling resistance PVC-PVC (PR):

An approximately 0.1 mm thick adhesive layer is applied to roughened PVC material (70×30 mm) The film is then air dried for 1 hour at room temperature. After shock activation for 10 seconds in a Funck activator, the adhesive strips are subjected to a pressure of 4 bar. Resistance measurement is carried out in a commercially available tensile testing machine immediately and three days after bonding.
Heat resistance test—ABS-PVC film (HR-ABS):

ABS test specimens (70×20 mm) are coated with 0.1 mm thick layers of the two-component adhesive mixture. The PVC film is bonded to the ABS material in a jaw press heatable on one side (surface temperature 100° C.). To this end, an equally large strip of PVC foam is pressed against the ABS test specimen for 10 seconds under a pressure of 4 bar. After bonding, the test specimen is stored for 3 days under standard climatic conditions. The peel test is carried out at 60° C. The time required to peel off a length of 60 mm under a load of 250 g at an angle of 180° is measured.

EXAMPLES

Dispersion A): prepared in accordance with German Auslegeschrift 1,495,745 from an adipic acid/butanediol polyester, an isocyanate mixture, a diamine containing sulfonate groups and an amino alcohol.
Dispersion A is made of:

| | | |
|---|---|---|
| 360 g | of a polyester of adipic acid/butanediol (OH value 50) |
| 23.35 g | of hexamethylene diisocyanate |
| 15.30 g | of isophorone diisocyanate |
| 12.90 g | of sodium salt of N-(2-aminoethyl)-2-aminoethansulfonic acid (45% in water) |
| 2.10 g | of diethanolamine |
| 565 g | of water |

The dispersion has a solids content of 40% by weight, a pH value of 7.5, a viscosity of 150 mPa.s (Brookfield LVT, spindle 2, 23° C.) and an average particle size of 120 nm (laser correlation spectroscopy). The softening temperature determined by the TMA described above is 45 to 50° C.

Dispersion B1): a polymer dispersion based on a copolymer of styrene (68%) and acrylonitrile (32% by weight), having a solids content of 39.7%, a viscosity of 26 mPa.s (Brookfield LVT, spindle 2, 23° C.) and an average particle size of 115 nm (laser correlation spectroscopy).

Dispersion B2): a polymer dispersion based on a copolymer of α-methyl styrene (72%) and acrylonitrile (28% by weight), having a solids content of 35.1%, a viscosity of 31 mPa.s (Brookfield LVT, spindle 2, 23° C.) and an average particle size of 70 nm (laser correlation spectroscopy).

Dispersion B3): a polymer dispersion based on a copolymer of α-methyl styrene (72% by weight) and acrylonitrile (28% by weight), having a solids content of 34.4%, a viscosity of 18 mPa.s (Brookfield LVT, spindle 2, 23° C.) and an average particle size of 58 nm (laser correlation spectroscopy).

Polyisocyanate C): an emulsifiable isocyanate as described in U.S. Pat. No. 4,663,377), example 2.

In the following Table, the quantities in which the dispersions are used are shown as parts by weight.

The adhesives were prepared by combining and stirring the constituents. The emulsifiable polyisocyanate was added to the dispersion mixture shortly before coating of the test specimens.

|     |          | Dispersion |          |          | Polyisoyanate |
|-----|----------|------------|----------|----------|---------------|
|     | A)       | B1)        | B2)      | B3)      | C)            |
| 1*  | 100 parts | —         | —        | —        | 3 parts       |
| 2   | 30 parts | 10 parts   | —        | —        | 3 parts       |
| 3   | 80 parts | 20 parts   | —        | —        | 3 parts       |
| 4*  | 50 parts | 50 parts   | —        | —        | 3 parts       |
| 5   | 90 parts | —          | 10 parts | —        | 3 parts       |
| 6   | 80 parts | —          | 20 parts | —        | 3 parts       |
| 7*  | 50 parts | —          | 50 parts | —        | 3 parts       |
| 8   | 90 parts | —          | —        | 10 parts | 3 parts       |
| 9   | 80 parts | —          | —        | 20 parts | 3 parts       |
| 10* | 50 parts | —          | —        | 50 parts | 3 parts       |

* = Comparison tests

|     | Results | | | | | | | | | |
|---|---|---|---|---|---|---|---|---|---|---|
| Example | 1* | 2 | 3 | 4* | 5 | 6 | 7* | 8 | 9 | 10* |
| Activation temperature (MAT), secs | 3 | 3 | 3 | 10 | 3 | 3 | 7 | 3 | 3 | 10 |
| Peeling resistance (PR), N mm | 5.5 | 5.7 | 6.5 | 3.7 | 6.6 | 3.2 | 1.5 | 3.4 | 2.0 | 2.0 |
| immediately after 3 days | 9.4 | 8.4 | 8.7 | 8.1 | 9.3 | 7.2 | 6.7 | 7.7 | 7.5 | 4.4 |
| Softening point (SP), ° C. | 100 | 96 | 78 | 66 | 107 | 107 | 107 | 109 | 111 | 95 |
| Heat resistance (HR), mins. | 10 | 22 | 103 | 225 | 35 | 130 | 225 | 28 | 63 | 105 |

* = Comparison tests

Table 1 shows the following:

1) The adhesive compounds according to the invention in contrast to Examples 1, 4, 7 and 10 are distinguished by the fact that even small quantities of dispersion B significantly improve the softening point of PVC-ABS bonds. Where the percentage content of dispersion B) exceeds 40% by weight, the activation temperature of the films is too high.

2) Comparison test with U.S. Pat. No. 4,762,880: One of the aromatic polyurethane dispersions (Desmocoll E-471) mentioned in column 4 of the '880 patent was reacted with the polyisocyanate C) in a ratio of 100:3 parts by weight immediately before use.

The polyurethane dispersion had a softening point of >70° C. PVC and ABS could not be bonded together by the test method described in Example 1 because the laminating temperature of 100° C. applied to the films (equivalent to about 60° C. to the adhesive film) was not high enough to activate the adhesive film. Higher laminating temperatures resulted in irreversible damage to the substrate and laminate.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for laminating thermoplastic moldings with heat-activatable adhesive films softened by heat, comprising applying the adhesive to a surface of the molding and contacting the surface with another molding surface to which the adhesive is optionally applied, wherein the heat-activatable adhesive film comprises a mixture containing:

A) at least one aqueous dispersion of a polymer which has a softening point of below 70° C., said dispersion containing 5 to 70% by weight solids and having a film-forming temperature below 70° C., and B) at least one aqueous dispersion of a polymer based on olefinically unsaturated monomers having a softening point above 70° C. said dispersion containing 5 to 70% by weight solids, wherein the weight ratio of dispersions A) to dispersion B) is from 97:3 to 60:40, based on the solids content of said dispersions C) at least one polyisocyanate compound containing at least two isocyanate groups.

2. The process of claim 1 wherein the polymer dispersion A) is a polyurethane polymer.

3. The process of claim 2 wherein the polymer of dispersion A) is a polyurethane containing incorporated hydrophilic groups.

4. The process of claim 3 wherein the polyurethane containing incorporated hydrophilic groups has a softening point of 50° C.

5. The process of claim 1 wherein the polymer dispersion B) is a styrene or alpha-meta styrene (co)polymer.

* * * * *